Oct. 3, 1944.   R. V. BURT   2,359,403
SOAP CUTTER
Filed Nov. 22, 1941   3 Sheets-Sheet 2
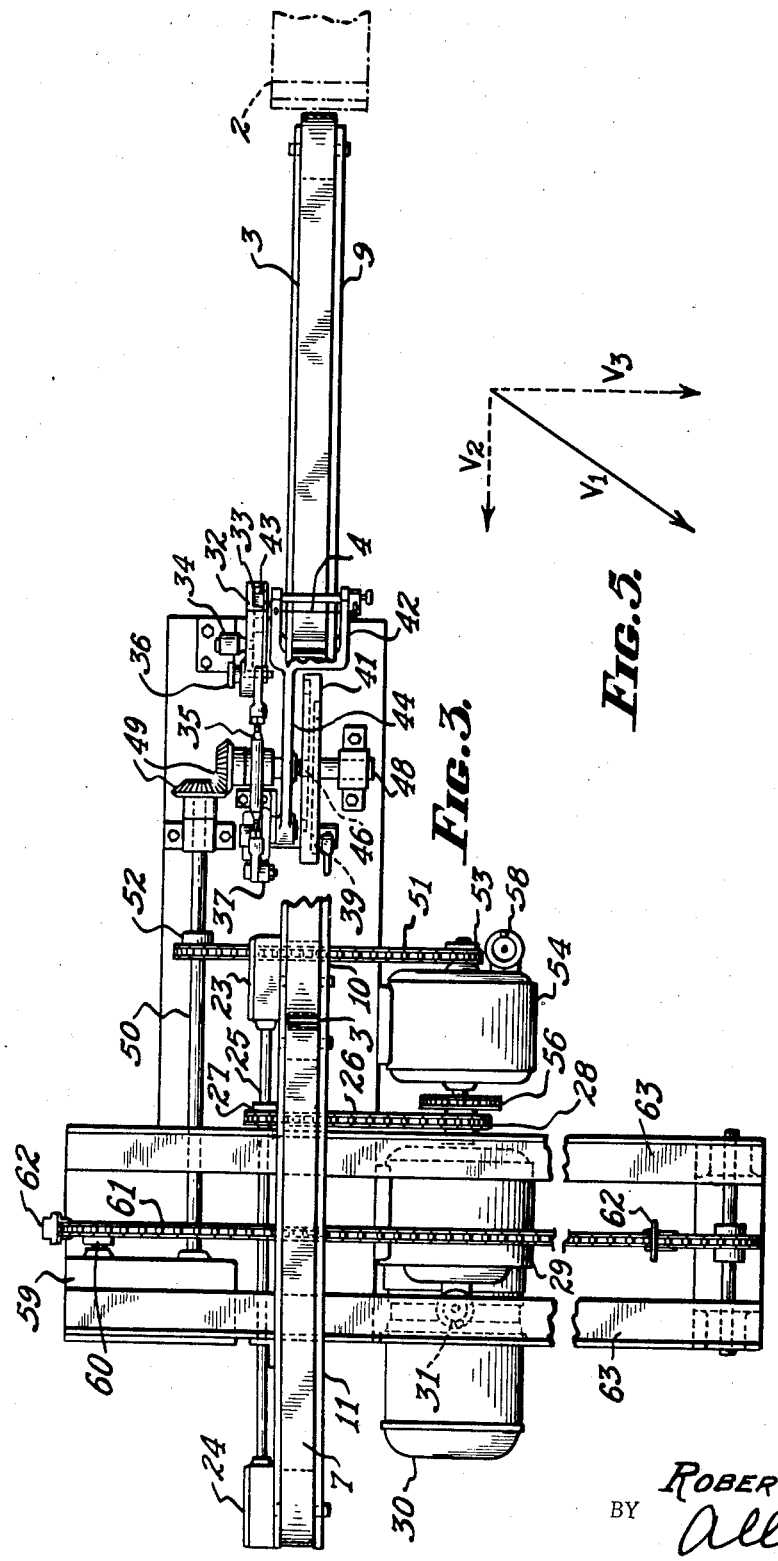
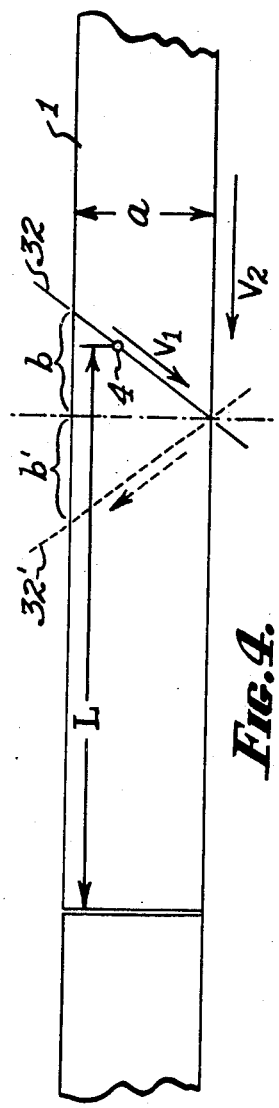
INVENTOR.
ROBERT V. BURT.
BY Allen & Allen
ATTORNEYS.

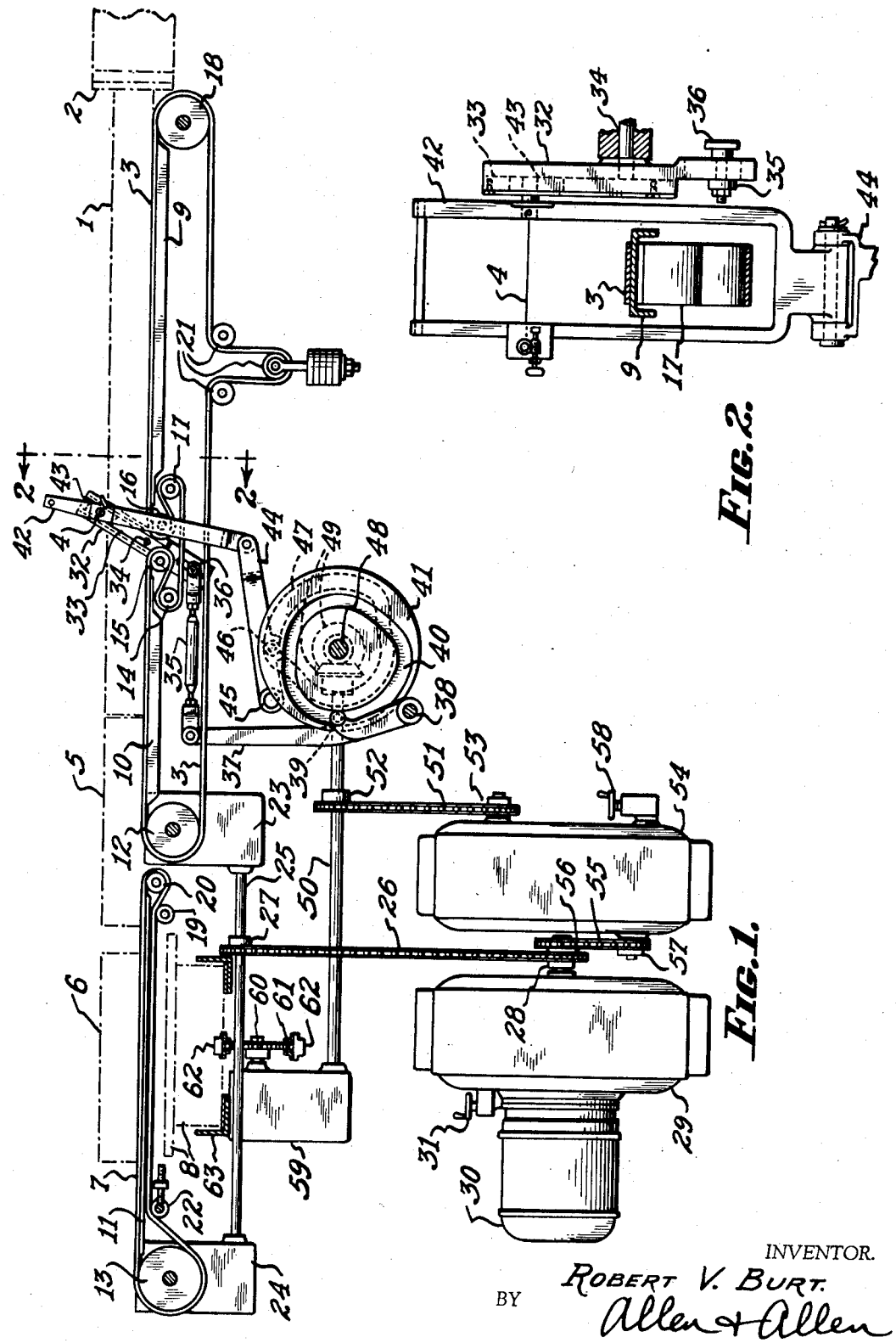

Oct. 3, 1944.  R. V. BURT  2,359,403
SOAP CUTTER
Filed Nov. 22, 1941  3 Sheets-Sheet 3

INVENTOR.
ROBERT V. BURT.
BY Allen & Allen
ATTORNEYS.

Patented Oct. 3, 1944

2,359,403

UNITED STATES PATENT OFFICE 2,359,403

SOAP CUTTER

Robert V. Burt, Cincinnati, Ohio, assignor to The Procter & Gamble Company, Cincinnati, Ohio, a corporation of Ohio Application November 22, 1941, Serial No. 420,145

6 Claims. (Cl. 25—106)

This invention relates to a method of cutting a continuously formed bar of relatively soft material into segments, and to a device adapted to perform this cutting operation.

Objects of my invention are: to provide an automatic means of cutting a continuously formed bar of soft material, while in motion, into segments of substantially equal length; in thus cutting the bar of material to produce segments whose cut end surfaces are substantially perpendicular to the longitudinal axis of said bar; and to provide adjustment means whereby said cutting operation may be adapted to cut said bar into segments of any desired length within the range of the machine at any rate of formation of said bar and with bars of different transverse dimensions.

Alternative objects are to provide a means of cutting said bar into segments whose end surfaces may be oblique to the longitudinal axis of said bar if so desired; and to provide a means of cutting said bar alternately into longer and shorter segments if so desired, all of said longer segments being substantially uniform in length and all of said shorter segments being substantially uniform in length.

Another object is to provide an automatic means of separating said cut segments one from another by means of a take-away belt conveyor traveling at a greater speed than said continuously formed bar.

Another object is to provide a means for feeding storage racks, on which said segments may be placed side by side, past said take-away belt at a speed proportionate to the frequency of the severing of the segments from the continuously formed bar.

A particular object is to provide a means of cutting into segments material of a soft, smeary character which is not cleanly cut by a knife having a wide blade.

Other objects are to provide a method of cutting soap, while in a soft, smeary, yet form-retaining condition, into clean-cut segments of equal length as said soap is extruded continuously in bar form; and to provide a method of transferring the cut segments of said soft soap onto storage racks or other receiving surfaces without marring or disfiguring said segments.

My invention is well suited for cutting into segments soap which is extruded in a form-retaining condition, for cutting continuously formed bars of butter, margarine, or shortening, for cutting extruded bars or rods of waxy material or semi-solid lubricating grease, or for any similar relatively soft material which may be severed by a quick cut of a taut wire or other suitable narrow cutting blade.

A preferred form of my cutting device, especially adapted for cutting extruded bar soap, is illustrated in the drawings.

Figure 1 represents a side elevation of the more essential elements of the device, with nearly all supporting structure omitted for the sake of clarity in showing the moving elements.

Figure 2 represents a vertical section at 2—2 of Figure 1, showing the construction of the cutting wire holder frame, or stirrup, and the cutter guide.

Figure 3 shows a plan view of the cutting device illustrated in Figure 1, together with supporting structure, part of the receiving belt being cut away in this view in order to show the cam more clearly.

Figure 4 shows, in side elevation, the paths of the extruding bar and of the cutting element.

Figure 6:
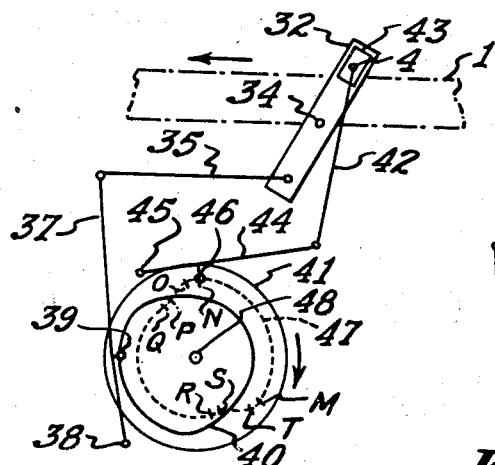

Figure 5 indicates the relationship existing between the velocity of the cutting element along its slanting path and the horizontal and vertical components of this velocity.

Figures 6, 7, 8, 9, 10, 11, 12, 13 and 14 represent diagrammatic side elevations of the bar of soap being cut, the cutter, its guide, and the cams and cam followers and connecting arms which actuate the cutter and guide, each of these figures showing these elements in a different position in one complete cycle of operation.

Referring especially to Figure 1, and also to Figures 2 and 3, element 1 represents a continuously formed bar of soap extruding from the orifice 2 of the soap plodder or other soap extruding machine. The extruding bar is supported by the receiving belt 3 which is adjusted to travel at substantially the same speed as the extruding bar. The soap cutter, which in this case is a tightly stretched, thin steel wire, is at the moment shown in the drawings stretched horizontally across the bar just above it at point 4, ready to start a downward cutting stroke. 5 and 6 are segments of soap which have been cut off of the continuously formed bar. Segment 6 has been separated from segment 5 as a result of the higher linear velocity of take-away belt 7 as compared with the velocity of receiving belt 3 and the continuous bar 1. 8 represents an end view of a soap rack which is moving horizontally at right angles to the take-away belt, and is located just below it for convenience in transferring by hand the cut and separated segments of soap from the take-away belt to the rack for storage, or further processing, or packing.

The soap conveying portions of the receiving and take-away belts are supported by supports 9, 10 and 11. These belts are guided by drive pulleys 12 and 13, by idler pulleys 14, 15, 16, 17, 18, 19 and 20, and by the weighted belt tightening pulleys 21 and the belt tightening pulley with screw adjustment 22.

The function of guide pulleys 14, 15, 16, and 17 is to guide belt 3 down and around the lowest position reached by cutting wire 4 and then back to a path in line with its original path. This arrangement is preferred to the alternative of having two separate belts serving in place of belt 3, one conveying the soap from 18 to 16 and the other from 15 to 12, because this alternative would present difficulties in operating these two belts at equal speeds.

The receiving belt and take-away belt are driven by pulleys 12 and 13 respectively, the latter being larger in diameter than the former, these pulleys in turn being driven through identical gear boxes 23 and 24 by the shaft 25 which is connected through chain 26 and sprockets 27 and 28 with the primary variable speed transmission represented at 29. This is driven by the motor 30. The speed of sprocket 28 may be varied with reference to the speed of the motor 30 by means of the control wheel 31.

The guide for the cutter stirrup is shown at 32, this guide being pivoted to the frame of the cutting device at 34, the axis of this pivot being at the same level as the upper surface of the receiving belt 3. Guide 32, along the side face of which is channel 33, is rocked or tilted on its pivot by connecting rod 35 which has a variable length adjustment as shown in Figure 1, and which has an adjustable attachment 36 to the lower arm of the guide, this adjustment consisting of a longitudinal slightly curved slot in the guide arm (the radius of curvature of this slot being the length of rod 35) and a threaded pin with lock nut which is pivoted to connecting rod 35. This connecting rod is moved back and forth by the cam follower lever arm 37 which is pivoted to the frame of the cutting device at 38 and which has a follower 39 running in the track 40 of cam 41.

Cutting wire 4 is stretched across from one arm to the other of cutter stirrup 42. On one arm of this stirrup is a slide element 43 pivoted at the level of the cutting wire and designed to slide in the channel 33 of the cutter guide. On the other arm of this stirrup is a wire tightener, similar to a banjo string adjustment. The cutter stirrup is moved up and down, so that the wire passes through the path of the continuously formed bar, by cam follower arm 44 pivoted to the frame at 45 and having a follower 46 which follows track 47, which is on the opposite side of cam 41 from track 40.

Cam 41 is turned on its axis 48 by bevel gears 49, one of which is keyed to shaft 50 which in turn is driven through chain 51 and sprockets 52 and 53 by the secondary variable speed transmission indicated at 54. This variable speed transmission is driven by the primary variable speed transmission 29, being connected therewith by chain 55 and sprockets 56 and 57. The speed of shaft 50 may be varied with respect to the speed of sprocket 56 by turning the control wheel 58.

Gear box 59, driven by shaft 50, drives the sprocket wheel 60 (see Fig. 3) which actuates the chain 61 carrying lugs 62 which push the rack 8 along the horizontal rack channels 63. An idler sprocket wheel supports the other end of chain 61.

In designing and operating the cutting device illustrated in the drawings, the speeds of the two conveyor belts, of the conveying chain, and of the cutting wire, are important, as are the timing of the strokes of the cutter, and as also are the control of these speeds and of this timing. An understanding of these factors may be gained by referring to Figures 4 and 5 and to the series of Figures 6 to 14, inclusive, and the following explanation.

In Figure 4 the continuously formed bar 1 is assumed to be moving towards the left at a linear velocity of $V_2$, while the cutting wire 4 is making a downward stroke, its absolute velocity in its diagonal path being $V_1$. In order that the bar may be cut perpendicular to its longitudinal axis, that is, in a vertical plane, when the bar is moving horizontally as shown, the diagonal velocity $V_1$ should be such that its horizontal component equals the bar velocity $V_2$. Inasmuch as the cutting wire is impelled on its downward stroke by the downward pull of arm 44 (Figures 6 to 14), which is a nearly vertical pull, it may be desirable to calculate the vertical component $V_3$ (see Figure 5) of velocity $V_1$. If the slope of cutter guide 32 is expressed as ($a$ vertical units $\div$ $b$ horizontal units), it is apparent that $V_3$ equals ($V_1$ multiplied by $a/b$). Expressed differently, while belt 3 and bar 1 are each traveling a distance $b$, the cutting wire should be moved downward a vertical distance $a$.

The rotary speed of the cam is such that it makes one complete revolution while the belt 3 is traveling a distance equal to the lengths of two adjacent soap segments. The cam track 47 consists of an arc of uniform radius MN (see Figure 6) corresponding to the interval during which the cutting wire is above the soap bar between strokes, a slanting and slightly curved portion OP, corresponding to the interval during which the wire is passing downward through the soap, an arc of uniform radius QR, corresponding to the interval during which the wire is below the soap bar between strokes, and the slanting and slightly curved portion ST corresponding to the interval during which the wire is passing upward through the soap in the second stroke of the cycle, and the connecting portions NO, PQ, RS and TM, corresponding to brief intervals just preceding and following the two cutting strokes. The radius of arcs MN and QR are such that the wire is held well above and well below the soap bar during these intervals, making allowance for the largest soap bar (in vertical dimension) that is to be cut by the machine.

The correct contours of slanting portions OP and ST are more conveniently derived by a graphical method on a drawing board than by pure mathematical calculations, especially since the downward movement of the right end of arm 44 is not a simple function of the vertical velocity of wire 4. For a typical soap velocity $V_2$, expressed in inches per second, and a proposed segment length L, expressed in inches, the correct R. P. M. of the cam is first calculated, employing the formula R. P. M. $=60V_2/2L$. For each of several points on the assumed path of the wire downward through the moving bar while cutting it vertically, employing a convenient guide slope $a/b$, (assuming in this case that $a$ is the vertical dimension of the largest bar to be cut by the machine), as plotted on paper on a drawing board, corresponding points on the cam track 47 are then plotted by means of drawing instruments, thus determining the correct contour of portion OP. In a similar manner the contour of portion ST is determined, this time assuming a guide slope of $a/b'$, where $b'$ equals $b$ numerically but is of opposite sign. (See Figure 4.)

The number of degrees of arc from point P (the end of the downward cut) to point S (the start of the upward cut) should 30 be 180° when the cutter guide is pivoted at the level of the upper surface of the receiving belt, as in the present example. Under these conditions the number of degrees of arc from point T (end of the upward cut) to point O (start of the downward cut) should equal $(180-360\ b/L)°$, when $b$ equals ($a$, i. e. the greatest vertical dimension in inches of any soap bar to be cut $\div$ slope $a/b$).

The connecting portions of the track, NO, PQ, RS and TM are drawn so as to connect the already determined portions of the track by smooth curved lines.

The design of cam track 40, which is on the reverse side of cam 41, is such as to cause the lower end of cutter guide 32 to move alternately to the left and to the right a sufficient distance to give the guide its desired slope during the intervals that cam follower 46 is following track 47 from M to N and from Q to R respectively, and to hold the guide motionless at its extreme positions while the cutting strokes are being made.

Figure 7:
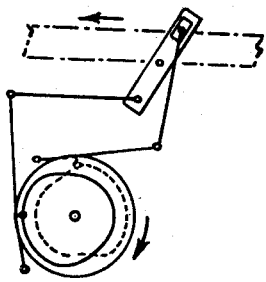
Figure 8:
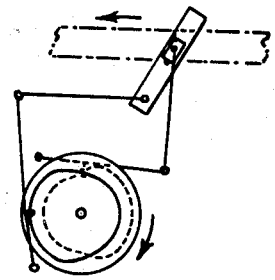
Figure 9:
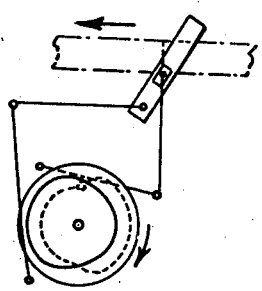
Figure 10:
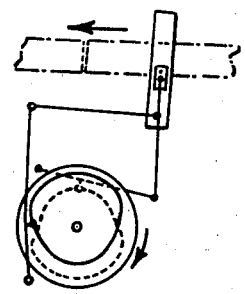
Figure 11:
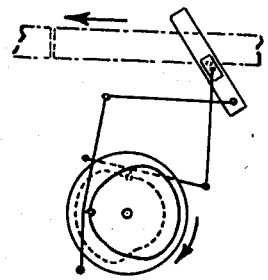
Figure 12:
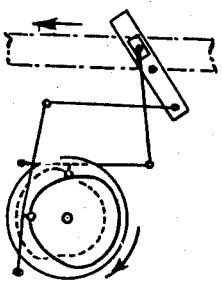
Figure 13:
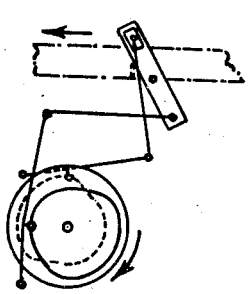
Figure 14:
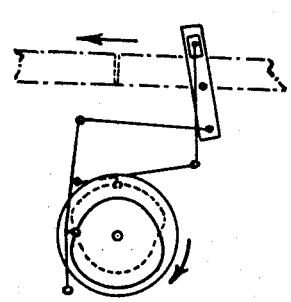

Figure 6 shows diagrammatically a side elevation of the more essential elements of the cutting device, with these elements numbered the same as in Figure 1. In Figure 6 the wire 4 is just about to start a downward stroke. Figures 7 to 14, inclusive, show the same elements as Figure 6, each in a different position during one complete cycle. In Figure 7 the downward stroke has commenced and the downward cut through the bar is about to begin; in Figure 8 the downward cut is about two thirds complete; in Figure 9 the downward stroke is just finished; in Figure 10 the cutter guide 32 is being shifted over to the opposite slope in preparation for the upward stroke; in Figure 11 the upward stroke is about to begin; in Figure 12 the upward stroke is progressing; in Figure 13 the upward stroke has just been completed; in Figure 14 the cutter guide is being shifted back to its original slope in preparation for the next downward stroke.

In preparing to operate my cutting device, the length of connecting rod 35 is adjusted so that the lower end of cutter guide 32 moves equal distances to the left and to the right of its axis 34 in assuming its extreme positions. In operating the device the speed of receiving belt 3 is regulated, by means of control wheel 31, to substantially equal that of the continuously formed extruding bar of soap. Control wheel 58 is then adjusted so that the cam speed is such that the segments of soap are cut to the desired lengths. Then with the machine temporarily stopped, the adjustment 36, which regulates the throw or slope of cutter guide 32, is set (most conveniently by a trial and error procedure) at the position which will result in the cuts through the soap bar being at right angles to the length of the bar.

Variations in speed of the extruding soap thereafter may be taken care of merely by regulating control wheel 31, without having to adjust control wheel 58 or adjustment 36 (because of the series arrangement of the two variable speed transmissions 29 and 54) as long as segments of the same length are desired. If it is desired to change the lengths of the segments, control wheel 58 is readjusted to change the frequency of cutting strokes accordingly, and adjustment 36 is readjusted to again produce right angled cuts through the bar.

It is obviously possible, if it is desired to cut segments on a bias, instead of at right angles, to do this by changing the length of connecting rod 35. It is also possible to cut alternately longer and shorter segments by employing a cam having sections OP and ST of cam track 47 spaced at different angular distances than the spacing previously described. Another permissible variation is to have the axis of cutter guide 32 either higher or lower than the preferred location (which is on a level with the top surface of the receiving belt). When this axis is at a higher or lower level, the angular spacing of portions OP and ST of cam track 41 will require changing accordingly. Other modifications of design, which do not depart from the basic operating principle of the device illustrated by way of example, fall within the scope of my invention.

It will be observed that the upward and downward strokes made by the cutting wire through the soap, in the device illustrated and herein described, are very fast strokes. As a result of the design of cam track 47 (in which only a small fraction of one 360° cycle is employed in activating each stroke, see Figure 6, portions OP and ST, respectively) the cutting wire passes completely through the soft, pasty soap so fast that plastic deformation, which would naturally occur if the wire moved too slowly through the surface skin of the soft extruded soap bar, does not occur to any significant or objectionable extent. Thus my device severs the extruding bar into clean-cut segments.

The rate of travel of rack 8 along its channels 63 normally varies in proportion to the frequency of the cutting of soap segments, since rack conveyor chain 61 and cam 41 are both driven by the common shaft 50. If the width of the bars being cut is changed, such that a different number of segments are to be placed side by side on each rack, a gear in gear box 24 may be changed to increase or decrease the rate of rack feed accordingly. The soap rack conveyor, comprising elements 59 to 63 inclusive, is an optional part of my device, and may be dispensed with if not needed for some purposes for which the cutting device is employed.

When the device described is employed to cut soft smeary extruded soap into segments, the cut segments are automatically separated one from another without marring by means of the takeaway belt which travels at a greater speed than the receiving belt and the soap thereon. The separated segments may then be transferred by hand, or otherwise, one by one to the racks, 8, or other receiving surfaces. This may conveniently be accomplished without marring or disfiguring the soft segments by lightly grasping the side surfaces of each segment between two relatively wide smooth surfaces of wood or other material, lifting the segment up off of the takeaway belt, and putting it down on the rack or other surface.

Having thus described my invention, what I claim and desire to secure by Letters Patent is:

1. In a machine for cutting a continuously formed moving bar of relatively soft material into successive segments of determinable length, the following combination of elements: (1) a cutter adapted to pass transversely through and thus sever said bar; (2) a guide, pivoted to the supporting structure of said machine, adapted to direct said cutter in a slant-wise path with reference to the direction of travel of said bar; (3) a cam and cam follower means adapted to change the slope of said guide after each cutter stroke, whereby the path of the next stroke, starting from the side of said bar on which the last stroke finished, has a longitudinal component having the same general direction as said direction of travel and a transverse component having a direction such as to pass through said bar from one side to the opposite side; and (4) a second cam and cam follower means adapted to impel said cutter along first one and then the other of said paths whereby each stroke proceeds along one of said slant-wise paths at a rate whose longitudinal component bears a determinable relation to the rate of travel of said bar.

2. In a machine for cutting a continuously formed moving bar of relatively soft material into successive segments of substantially equal length, the following combination of elements: (1) a cutter adapted to pass transversely through and thus sever said bar; (2) a guide, pivoted to the supporting structure of said machine, adapted to direct said cutter in a slant-wise path with reference to the direction of travel of said bar; (3) a cam and cam follower means adapted to reverse the slope of said guide after each cutter stroke, whereby the path of the next stroke, starting from the side of said bar on which the last stroke finished, has a longitudinal component having the same general direction as said direction of travel and a transverse component having a direction such as to pass through said bar from one side to the opposite side; (4) an adjustment means whereby the slopes assumed by said guide for said cutter strokes may be controlled; and (5) a second cam and cam follower means adapted to impel said cutter along first one and then the other of said paths whereby each stroke proceeds along one of said slant-wise paths at a rate whose longitudinal component substantially equals the rate of travel of said bar, and adapted to start each successive stroke at such a time interval after the completion of the preceding stroke that the lengths of successive segments cut from said moving bar are substantially equal.

3. A machine for cutting a continuously formed moving bar of relatively soft material into successive segments of substantially equal length, comprising: (1) an automatic cutting mechanism adapted to pass a cutter transversely through said moving bar while keeping pace with its longitudinal movement, thereby severing said bar with a cut that is substantially perpendicular to its longitudinal axis, said cutter being adapted to make alternate strokes through said bar in opposite transverse directions at intervals timed to produce cut segments of substantially uniform length, said length being controllable by adjustment of the timing of said mechanism; (2) a motor driving said cutting mechanism; (3) a conveyor belt, driven by said motor, traveling in the same general direction as said moving bar at a speed greater than that of said bar, adapted to receive said cut segments and convey them away from the cutting mechanism; and (4) a supporting surface adapted to receive said cut segments in side-by-side relationship, said surface being moved by said motor at a uniform speed proportionate to the frequency of said cutting strokes in a horizontal direction substantially at right angles to said conveyor belt and adjacent thereto.

4. A machine for cutting a continuously formed moving bar of relatively soft material into successive segments of substantially equal length, comprising: (1) an automatic cutting mechanism adapted to pass a cutter transversely through said moving bar while keeping pace with its longitudinal movement, including two conveyor belts, one for receiving the extruding bar and the other for taking away the cut segments thereof, a cutter, a cutter guide, two cams, one impelling the cutter back and forth through the bar in alternate strokes and the other controlling the alternate sloping positions of the guide which guides said cutter through said bar; (2) a motor driving said cutting mechanism; (3) a variable speed transmission interposed between said motor and said conveyor belts; and (4) a second variable speed transmission interposed between the said first variable speed transmission and said cams.

5. A machine for cutting an extruded bar of soap into segments of equal length, comprising: (1) a continuous belt adapted to move at a speed corresponding to that of said bar of soap and to receive said bar and convey it horizontally past a cutting mechanism and deliver the cut segments to a continuous take-away belt; (2) said take-away belt driven at a velocity slightly faster than said first belt and adapted to convey separated segments of soap from said first belt; (3) a rack conveyor moving below and transverse to said take-away belt at a speed proportionate to the frequency of the cutting strokes of said cutting machine; (4) a horizontal cutting wire supported tautly in a stirrup frame straddling said bar of soap; (5) a cam and follower mechanism driven at a speed normally proportionate to the speed of said first conveyor belt but independently adjustable with reference thereto, said stirrup frame and said mechanism being adapted to move said cutting wire upwardly and downwardly completely through said bar in alternate strokes; (6) a pivoted guide member adapted to guide in a slant-wise path the direction of motion of said cutter wire while said wire cuts through said soap; and (7) a cam and follower mechanism for alternately reversing the slope of said guide member after each stroke, whereby one component of said slant-wise path of said wire has a direction corresponding to the direction of travel of said bar of soap.

6. A machine for cutting a horizontally extruded bar of soap into segments of equal length, comprising: (1) a continuous belt adapted to move in a direction and at a speed corresponding to that of said bar of soap and to receive said bar and convey it horizontally past a cutting mechanism and deliver the cut segments to a continuous take-away belt, said first belt being guided down and around the lowest position reached by the cutting wire of said mechanism and then being guided back up beyond said position into its original line of travel; (2) said take-away belt driven at a velocity somewhat faster than said first belt and adapted to convey separated segments of soap from the first belt; (3) a horizontal cutting wire supported tautly in a stirrup frame straddling said bar of soap; (4) a cam and follower mechanism driven at a speed normally proportionate to the speed of said first conveyor belt but independently adjustable with reference thereto, said stirrup frame and said mechanism being adapted to move said cutting wire upwardly and downwardly completely through said soap in alternate strokes; (5) a guide member pivoted at the level of the upper surface of said first or receiving belt, said member having an upper arm adapted to guide in a slant-wise path the direction of motion of said cutter wire while said wire cuts through said soap, and a lower arm adapted to connect with a shifting mechanism; (6) a cam and follower shifting mechanism for alternately reversing the slope of said guide member after each stroke, whereby one component of said slant-wise path has a direction corresponding to the direction of travel of said bar of soap, said shifting mechanism comprising a cam, a cam follower adapted to follow the track of said cam at a point substantially on a level with the axis of said cam, a cam follower lever arm, one end of which is pivoted to the frame of said machine and the other end of which describes an arc having a substantially horizontal chord as said arm rocks back and forth responsive to the action of said cam and follower, and a connecting rod linking the free end of said arm with the lower end of said guide member; and (7) an adjustment for said shifter mechanism adapted to control the degree of slope of said guide member during said strokes, this adjustment comprising: means of fixing the point at which said connecting rod is pivoted to the lower arm of said guide member in any desired position along an arc, on said lower arm, which has a radius equal to the length of said connecting arm and a chord substantially perpendicular to the longitudinal axis of said connecting arm.

ROBERT V. BURT.